United States Patent
Huang et al.

(10) Patent No.: US 9,699,280 B2
(45) Date of Patent: Jul. 4, 2017

(54) BACK COVER RELEASING MECHANISM FOR MOBILE DEVICE, BACK COVER AND MOBILE DEVICE USING THE SAME

(71) Applicant: Nokia Technologies Oy, Espoo (FI)

(72) Inventors: Wuyang Huang, Beijing (CN); Zhigang Chen, Beijing (CN)

(73) Assignee: Nokia Technologies Oy, Espoo (FI)

( * ) Notice: Subject to any disclaimer, the term of this patent is extended or adjusted under 35 U.S.C. 154(b) by 135 days.

(21) Appl. No.: 14/529,411

(22) Filed: Oct. 31, 2014

(65) Prior Publication Data

US 2015/0126258 A1 May 7, 2015

(30) Foreign Application Priority Data

Nov. 1, 2013 (CN) .......................... 2013 1 0539754

(51) Int. Cl.
*H04M 1/00* (2006.01)
*H04M 1/02* (2006.01)

(52) U.S. Cl.
CPC ....... *H04M 1/0262* (2013.01); *H04M 1/0249* (2013.01); *H04M 2001/0204* (2013.01)

(58) Field of Classification Search
CPC .. H04M 1/72519; H04M 1/0214; H04M 5/02; H04M 1/02; H04M 1/06; H04B 1/3888
USPC ..... 455/550.1, 575.1, 0.3, 0.4, 0.8; 379/330, 379/428.01, 447
See application file for complete search history.

(56) References Cited

U.S. PATENT DOCUMENTS

| 6,104,621 | A  | * | 8/2000 | Weadon ............... H04B 1/3833 361/754 |
| 7,146,198 | B2 | * | 12/2006 | Yu ......................... H04M 1/236 379/433.06 |
| 7,711,401 | B2 | * | 5/2010 | Lim ..................... H05K 9/0067 200/181 |

(Continued)

FOREIGN PATENT DOCUMENTS

| CN | 1498012 A | 5/2004 |
| CN | 101958406 A | 1/2011 |

(Continued)

OTHER PUBLICATIONS

Office Action and Search Report for Chinese Patent Application No. 201310539754.X dated Mar. 21, 2017, with English language summary, 10 pages.

*Primary Examiner* — Steve D Agosta
(74) *Attorney, Agent, or Firm* — Alston & Bird LLP (57) ABSTRACT

Embodiments of the present invention relate to a back cover releasing mechanism, a back cover and a mobile device using the same. The back cover releasing mechanism for a mobile device comprises an elongated side key comprising a first end and a second end, configured to be mounted along and in parallel with a side of the mobile device; and a sliding member comprising a base portion configured to be coupled to the side key, and a latch portion, wherein the latch portion is configured to engage a back cover of the mobile device, and wherein the latch portion is also configured to be disengaged from the back cover of the mobile device if the first end and the second end of the side key are both pressed toward the interior of the mobile device and the base portion of the sliding member is forced to move toward the interior of the mobile device.

20 Claims, 5 Drawing Sheets

(56) References Cited

U.S. PATENT DOCUMENTS

| | | | |
|---|---|---|---|
| 7,979,091 B2 | 7/2011 | Christensen et al. | |
| 8,010,170 B2* | 8/2011 | Shi | H01M 2/1066 455/550.1 |
| 8,023,264 B2* | 9/2011 | Shen | H01M 2/1066 361/679.58 |
| 8,085,529 B2* | 12/2011 | Zhang | H01H 13/705 361/679.01 |
| 8,203,838 B2* | 6/2012 | Lin | H04M 1/0262 361/679.58 |
| 8,223,490 B2* | 7/2012 | Dong | E05C 3/162 361/679.01 |
| 8,264,837 B2* | 9/2012 | Pakula | G06F 1/1626 220/4.02 |
| 8,342,325 B2* | 1/2013 | Rayner | G06F 1/1626 206/305 |
| 2004/0072589 A1* | 4/2004 | Hamamura | H04B 1/3833 455/550.1 |
| 2004/0203525 A1* | 10/2004 | Gillette | H04M 1/0214 455/550.1 |
| 2005/0202788 A1* | 9/2005 | Vinson | H04B 1/086 455/90.3 |
| 2006/0051050 A1* | 3/2006 | Ning | G11B 19/025 386/219 |
| 2008/0045281 A1* | 2/2008 | Huang | H04M 1/0237 455/575.4 |
| 2009/0075707 A1* | 3/2009 | Lee | H04M 1/0237 455/575.4 |
| 2009/0194008 A1* | 8/2009 | Hayakawa | D05B 19/10 112/102.5 |
| 2011/0231342 A1* | 9/2011 | Schaible | G06Q 10/06 705/412 |
| 2011/0315564 A1* | 12/2011 | Guthrie | H02J 9/005 205/792 |
| 2012/0211382 A1 | 8/2012 | Rayner | |
| 2012/0302167 A1* | 11/2012 | Yun | G06F 3/04883 455/41.2 |

FOREIGN PATENT DOCUMENTS

| | | |
|---|---|---|
| CN | 202435457 U | 9/2012 |
| EP | 1 764 986 A1 | 3/2007 |
| EP | 2 521 205 A1 | 11/2012 |
| WO | WO 2008/142426 A2 | 11/2008 |

* cited by examiner

FIG. 5

BACK COVER RELEASING MECHANISM FOR MOBILE DEVICE, BACK COVER AND MOBILE DEVICE USING THE SAME

FIELD OF THE INVENTION

Embodiments of the present disclosure relate to a mobile device and specifically to a back cover releasing mechanism for a mobile device, a back cover and the mobile device using the same.

BACKGROUND OF THE INVENTION

As electronics technology and communications technology develop, mobile devices such as cellphones tend to be designed more and more artistic while powerful. As a result, unibody mobile devices become popular nowadays. Although many of this kind of mobile devices are not designed for their battery covers (also referred to as back cover hereinafter) to be opened, some of them, however, are designed for doing so. Therefore, how to open a back cover of a unibody mobile device easily becomes a challenge in the art.

Among conventional solutions, adding a button on the mobile device for releasing/unlocking the battery cover is convenient for opening. However, an extra button will obviously impact the appearance of a mobile device, especially a unibody mobile device. Another solution is to break away a back cover of a mobile device by a pre-reserved gap, which is not convenient and entails potential risk of damaging the mobile device. In view of the forgoing, there are lacks of effective methods and mechanisms in the art for opening a back cover of a mobile device.

SUMMARY OF THE INVENTION

In order to address the foregoing and other potential problems, embodiments of the present disclosure propose a back cover releasing mechanism, a back cover and a mobile device using the same.

According to a first aspect, embodiments of the present disclosure provide a back cover releasing mechanism for a mobile device, comprising an elongated side key and a sliding member. The side key comprises a first end and a second end, and is configured to be mounted along and in parallel with a side of the mobile device. The sliding member comprises a base portion configured to be coupled to the side key, and a latch portion, wherein the latch portion is configured to engage a back cover of the mobile device. Moreover, the latch portion is also configured to be disengaged from the back cover of the mobile device if the first end and the second end of the side key are both pressed toward the interior of the mobile device and the base portion of the sliding member is forced to move toward the interior of the mobile device.

According to a second aspect, embodiments of the present invention provide a back cover of a mobile device comprising a profile portion forming on its inner side. The back cover is configured to detachably engage the latch portion of the sliding member of the back cover releasing mechanism illustrated above.

According to a third aspect, embodiments of the present invention provide a mobile device using the back cover releasing mechanism and the back cover described above. In addition, the mobile may also comprise a flexible printed wiring circuit board for generating electronic signals.

These and other optional embodiments of the present invention can be implemented to realize one or more of the following advantages. In accordance with some embodiments of the present disclosure, the back cover of a mobile device can be easily opened without adding an extra button.

BRIEF DESCRIPTION OF THE DRAWINGS

Through the more detailed description of some preferred embodiments of the present disclosure in the accompanying drawings, the above and other objects, features and advantages of the present disclosure will become more apparent, wherein the same reference numerals generally refer to the same components in the embodiments of the present disclosure.

DETAILED DESCRIPTION OF EMBODIMENTS

Some preferred embodiments will be described in more detail with reference to the accompanying drawings, in which the preferred embodiments of the present disclosure have been illustrated. However, the present disclosure can be implemented in various manners, and thus should not be construed to be limited to the embodiments disclosed herein. On the contrary, those embodiments are provided for thorough and complete understanding of the present disclosure, and completely conveying the scope of the present disclosure to those skilled in the art.

Figure 1:
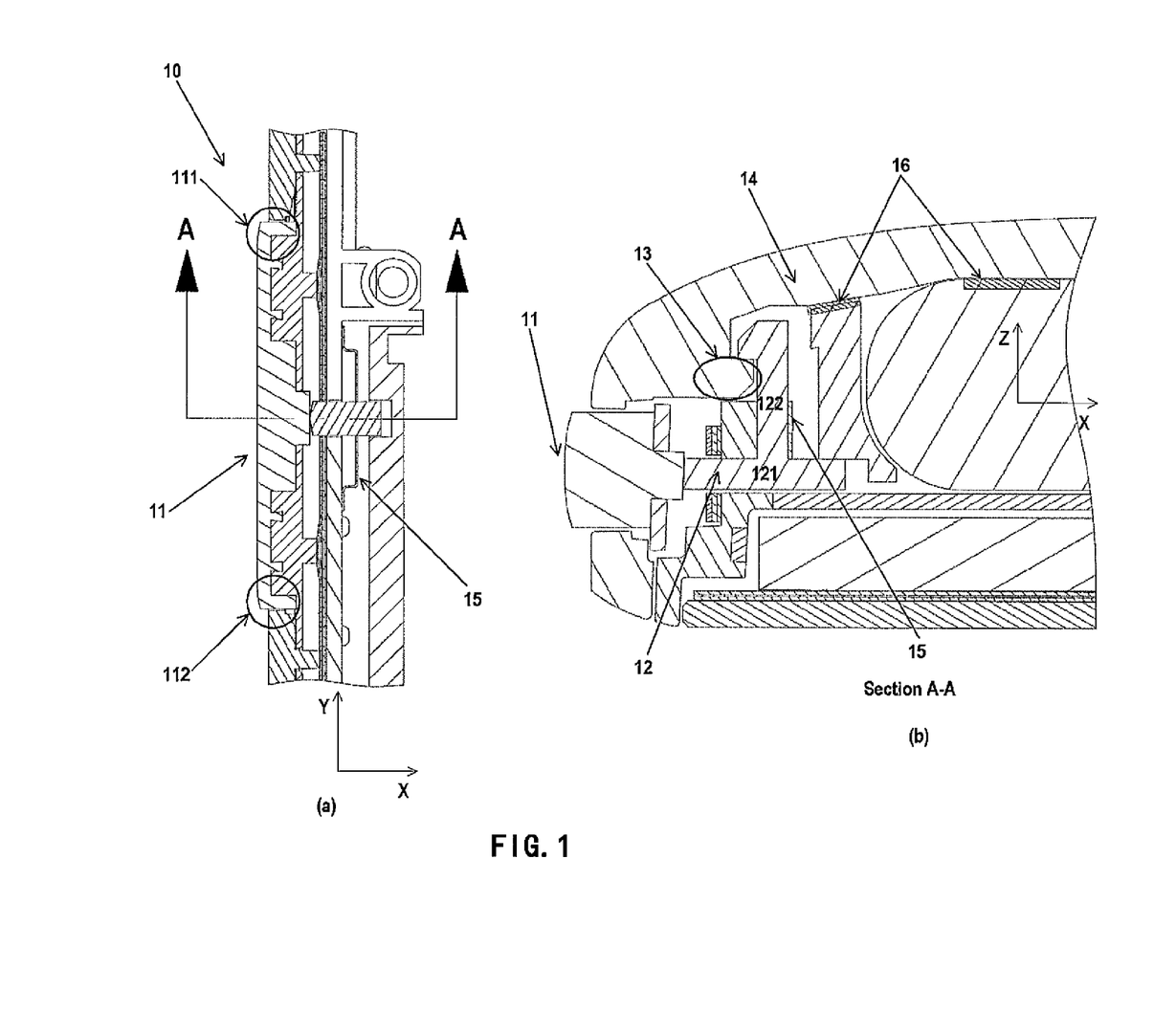
FIG. 1 schematically illustrates a partial perspective diagram of the back cover releasing mechanism and its sectional view according to an embodiment of the present disclosure.

Reference is first made to FIG. 1, which schematically illustrates a partial perspective diagram of the back cover releasing mechanism and its sectional view according to an embodiment of the present disclosure. As shown in FIG. 1(a), the back cover releasing mechanism may be designed for a mobile device 10 such as a cell phone, and may comprise an elongated side key 11 comprising a first end 111 and a second end 112 along its longitude direction. In a preferred implementation, the side key 11 is combined with an existing key, for example, a volume key. Additionally, the side key 11 is of an outer side for pressing and an inner side within the mobile device. Furthermore, the side key 11 can be configured to be mounted along and in parallel with any side of the mobile device 10.

For better detailed the back cover releasing mechanism, FIG. 1(b) schematically illustrates an A-A sectional view of FIG. 1(a). As shown in FIG. 1 (b), besides the side key 11, the back cover releasing mechanism may also comprise a sliding member 12. As seen from the sectional view, the sliding member 12 comprises a base portion 121 and a latch portion 122. The base portion is coupled to the side key 11 and the latch portion 122 is configured to engage a back cover 14 of the mobile device 10. In an implementation, the latch portion 122 may be a hook or a snap. However, a person skilled in the art shall note that other types of the latch portion 122 also fall within the scope of the present invention, as long as they can realize the function of engaging with the back cover 14 of the mobile device. The present invention is not limited to any specific shape or any specific fabricating approach in this regard.

In an exemplary implementation, an end of the latch portion 122 may extend toward the side key 11, as shown in FIG. 1(*b*); while in another exemplary implementation, an end of the latch portion 122 may alternatively extend parallel to the longitude direction of the side key 11 (not shown in FIG. 1(*b*)). The present disclosure is not intended to be restricted in this regard. A sectional view of the sliding member 12 is preferably of an invert T shape, as shown in FIG. 1 (*b*). However, it is understood that the invert T shape is only exemplary, and there could be other appropriate shapes, such as "⌐" shape, for the section view. (not shown in FIG. 1 (*b*))

To engage well with the latch portion 122, the back cover of the mobile device may be provided with a profile portion 13 forming on its inner side. In a preferred implementation, the profile portion 13 is positioned in proximity to the latch portion 122 and is configured to extend opposite to the extending direction of the latch portion. Thus, if the first end 111 and the second end 112 of the side key 11 are both pressed toward the interior of the mobile device 10 (e.g., moves along the x axis), the base portion 121 of the sliding member 12 is forced to move toward the interior of the mobile device 10 (e.g., also moves along the x axis) by the side key 11, such that the latch portion 122 of the sliding member 12 is disengaged from the back cover 14, in particular, from the profile portion 13. However, if only one of the ends 111, 112 is pressed, the sliding member 12 will function, for example, like a pivot for the side key 11 and will not disengaged from the back cover 14 (later in detail), thus the profile portion 13 will not be disengaged from the latch portion 122, and the back cover 14 will not be released from the main body.

Preferably, the back cover releasing mechanism may further comprise a spring member 15 configured to be provided with a pre-load so as to hold the sliding member 12 against the side key 11. The spring member 15 may be, but not limit to, a spring or an elastic slice. With the pre-load, the spring member is capable of fully engaging the latch portion 122 with the profile portion 13. The spring member 15 may be positioned at a remote side away from the side key 11 of the latch portion 122, as shown in FIG. 1 (*b*). As an alternative, the spring member 15 may be positioned at a remote end away from the side key 11 of the base portion 121. (not shown in FIG. 1(*b*)) In a case that the spring member 15 is a tension spring, it can even be positioned at a side close to the side key 11 of the latch portion 122. The present disclosure is not intended to be restricted in this regard.

According to a preferred embodiment herein, there may be provided one or more elastic members 16 between the back cover 14 and a main body of the mobile device 10 which are positioned close to the sliding member 12, as shown in FIG. 1 (*b*). In response to the latch portion 122 of the sliding member 12 being disengaged from the profile portion 13, at least a part of the back cover 14 springs away from the main body by force from the one or more elastic members 16, thereby forming a gap between the back cover 14 and the main body for opening the back cover 14. It should be noted that, the one or more elastic members 16 are optional. That is, even without the elastic members 16, the back cover 14 may also be opened due to the disengagement of the profile portion 13 from the latch portion 122.

Figure 2:
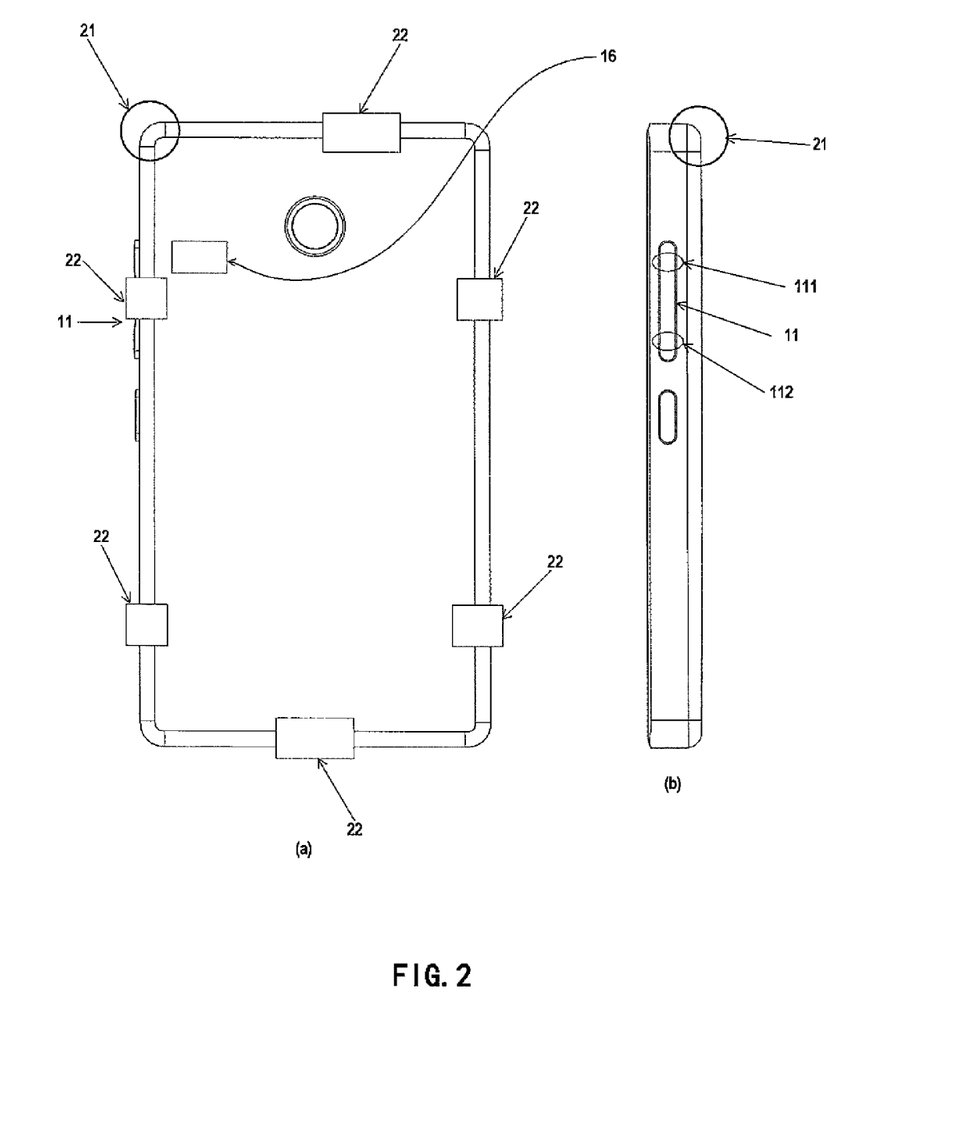
FIG. 2 schematically illustrates a back view and side view of the arrangement of a back cover releasing mechanism according to an embodiment of the present disclosure.

Referring now to FIG. 2, which schematically illustrates a back view and side view of the arrangement of a back cover releasing mechanism according to an embodiment of the present disclosure. As shown in FIGS. 2(*a*) and 2(*b*), the side key 11 may be positioned at a side of the mobile device 10 and be combined with the volume key, wherein a first end 111 and the second end 112 of the side key 11 can be the volume up end and the volume down end respectively. The elastic member 16 may be positioned close to the side key 11. (also close to the sliding member, not shown in FIG. 2) When the first end 111 and the second end 112 are both pressed, and the profile portion of the back cover is disengaged from the latch portion of the sliding member, a corner 21 close to the side key 11, for example, may spring away from the main body to form a gap between the back cover and the main body for opening the back cover. As seen from FIG. 2(*a*), there can also be provided with at least one snap 22, for example, for each side of the mobile device 10 to better lock the back cover.

Figure 3:
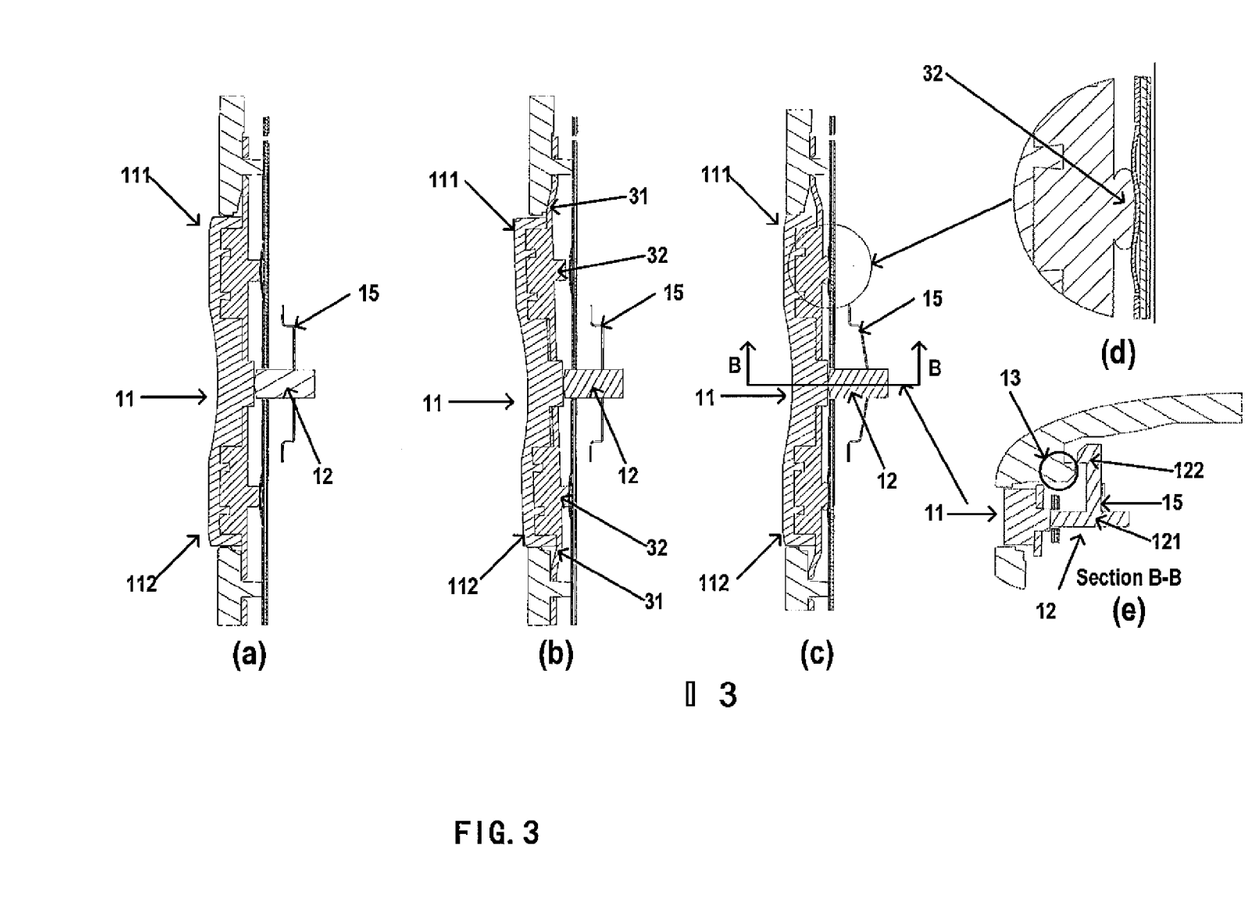
FIG. 3 schematically illustrates work conditions of the back cover releasing mechanism according to an embodiment of the present disclosure.

Reference is now made to FIG. 3. FIG. 3 schematically illustrates work conditions of the back cover releasing mechanism according to an embodiment of the present disclosure. In this embodiment, the side key 11 may be flexible-connected with the back cover by a flexible material 31 such as rubber. Furthermore, the side key 11 may be taken off together with the back cover from the main body of the mobile device. For better illustrate the present disclosure, take the side key 11 as combining with a volume key. FIG. 3(*a*) shows exemplary an original position for the back cover releasing mechanism. As seen from FIG. 3(*a*), the sliding member 12 is held against the side key 11 by the spring member 15, preferably with a pre-load. If only one end of the volume key 11, for example the down volume end 112, is pressed, as shown in FIG. 3(*b*), the sliding member 12 functions as a pivot for the side key 11. As a result, the flexible connection 31 at down volume end will be distorted while that at the up volume end 111 will not. Thus a plunger 31 with a metal dome at this end is compressed so as to trigger related circuits to lower the volume, while the spring member 15 remains undeformed (or remains slightly deformed due to a pre-load). Thus, the down volume end functions as a volume key in this situation. Referring now to FIGS. 3(*c*) and 3(*d*), the latter one is a partial enlarged view of the former one. If the up volume end 111 and the down volume 112 are both pressed, as shown in FIG. 3(*c*), plungers 31 at both ends are compressed, as shown in FIG. 3(*d*), which will disable the volume function of the side key 11. Then, the sliding member 12 moves along with the side key 11, and as a result, the latch portion 122 will be disengaged from the profile member 13 of the back cover, as shown in FIG. 3(*e*). Moreover, back to FIG. 3(*c*), the spring member 15 is deformed by the press, and the deformed spring member 15 will help to restore the sliding member 12 together with the side key 11 back to their original positions.

Back to FIG. 3(*b*), as an example, a force for pressing either end of the side key 11 may be under 10 N (newton), preferred of 3N. In addition, the distance that either pressed end of the side key 11 moves ranges from 0.1 mm to 0.5 mm, preferred of 0.3 mm. Back to FIG. 3(*c*) again, as another example, the force for pressing both ends of the side key 11 may range from 10 N to 20N, preferred of 15N. Additionally, the distance that the side key 11 moves as a whole due to the press on both ends ranges from 0.3 mm to 1 cm, preferred of 0.5 mm. Those skilled in the art will understand that numerals listed above are only for example and can be adjusted as necessary.

Figure 4:
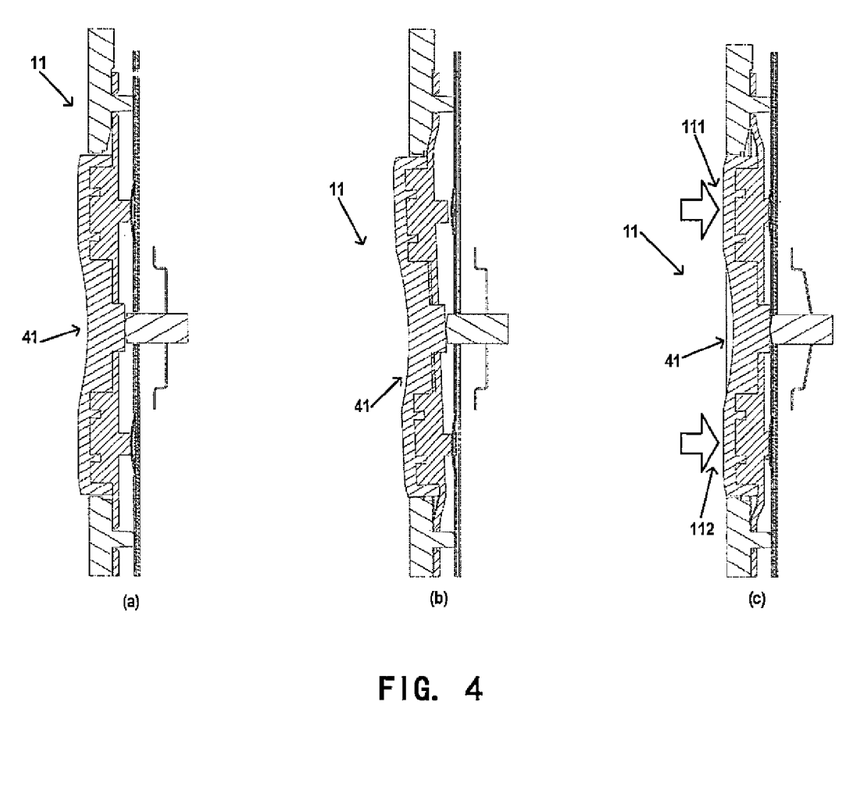
FIG. 4 schematically illustrates a schematic diagram of a back cover releasing mechanism according to another embodiment of the present disclosure.

FIG. 4 schematically illustrates a schematic diagram of a back cover releasing mechanism according to another embodiment of the present disclosure. As shown in FIG. 4(a), the side key 11 may be provided with a dent 41 at its central area. By means of the dent, when a user attempts to press at the central area of the side key 11, his/her finger will be stopped by a unibody cover wall, for example, of the mobile device, as shown in FIG. 4(b). In this way, the back cover releasing mechanism can be activated only by pressing both ends of the side key 11. According to an exemplary implementation, the side key 11 may be made from plastics. Considering the impact of the dent 41, the central area of the side key 11 may be strengthened, for example, by adding more plastics. As a reference, the stiffness for the central area may be designed such that in the case that a force pressed on each end of the side key 11 is about 10N, the maximum deformation of the central area is no more than 0.1 mm.

Figure 5:
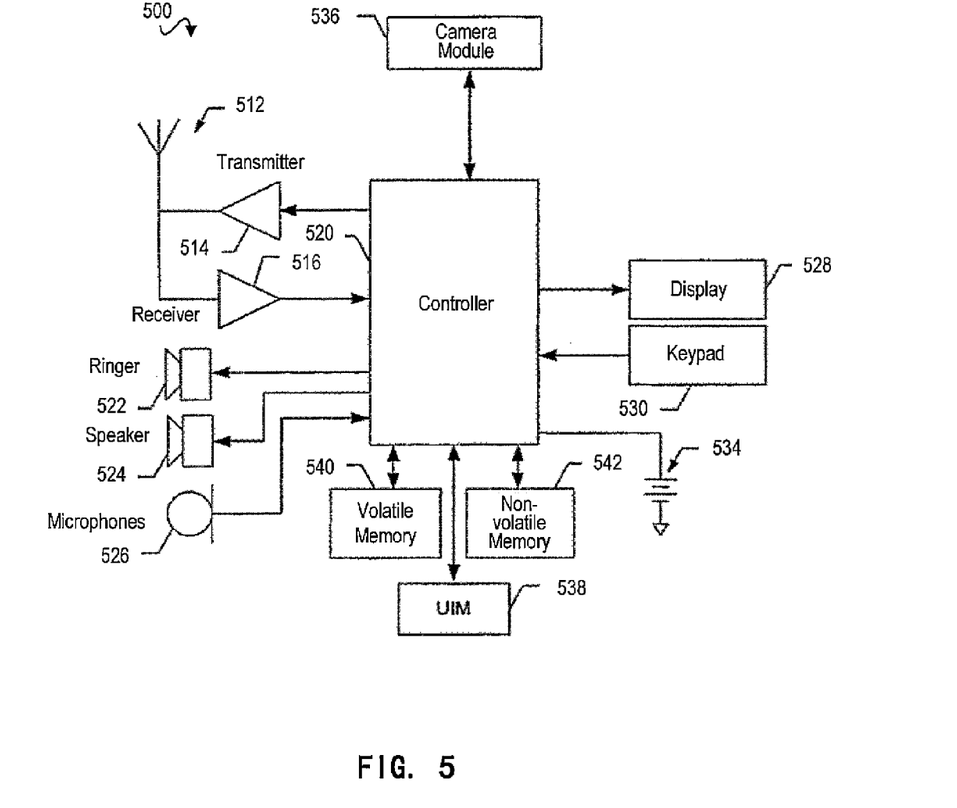
FIG. 5 schematically illustrates a block diagram of a mobile device 500 using the back cover releasing mechanism and the back cover according to embodiments herein.

FIG. 5 schematically illustrates a block diagram of a mobile device 500 using the back cover releasing mechanism and the back cover according to embodiments herein. In addition, the mobile device 500 may further comprise a printed wiring circuit board, preferred a flexible printed wiring circuit board, for generating electronic signals. Moreover, the mobile device 500 may be provided with a wireless communication capability. However, it should be understood that it is merely exemplary and non-limiting. Other types of mobile devices may also easily adopt embodiments of the present invention, such as a portable digital assistant (PDA), a pager, a mobile computer, a mobile TV, a game apparatus, a laptop, a camera, a video camera, a GPS device, and other types of voice and textual communication system. A fixed-type user device may likewise easily use embodiments of the present invention.

The device 500 comprises one or more antennas 512 operable to communicate with the transmitter 514 and the receiver 516. The device 500 further comprises at least one processor controller 520. It should be understood that the controller 520 comprises a circuit required for implementing the function of the mobile terminal 500. For example, the controller 520 may comprise a digital signal processor device, a microprocessor device, an A/D converter, a D/A converter, and other support circuits. The control and signal processing functions of the device 500 are allocated in accordance with respective capabilities of these devices. The device 500 may further comprise a user interface, which, for example, may comprise a ringer 522, a speaker 524, a microphone 526, a display 528, and an input interface, and all of the above devices are coupled to the controller 520. Specially, input interface may include, among other things, a keypad 530 according to embodiments of the present invention as detailed above.

The device 500 may further comprise a camera module 536 for capturing static and/or dynamic images. The device 500 further comprises a battery 534, such as a vibrating battery set, for supplying power to various circuits required for operating the mobile terminal 500 and alternatively providing mechanical vibration as detectable output. The device 500 may further comprise a user identification module (UIM) 538. The UIM 538 is usually a memory device with a processor built in. The UIM 538 may for example comprise a subscriber identification module (SIM), a universal integrated circuit card (UICC), a universal user identification module (USIM), or a removable user identification module (R-UIM), etc. The UIM 538 may comprise a card connection detecting apparatus according to embodiments of the present invention.

The several exemplary embodiments of the present invention have been described above just for the purpose of illustration. It should be understood that the present invention is not limited to the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. A back cover releasing mechanism for a mobile device, comprising:
   an elongated side key comprising a first end and a second end, configured to be mounted on a side of the mobile device such that a longitude direction of the side key is parallel with the side of the mobile device, wherein the side key is a multifunction key configured such that pressing of the first end causes performance of a first function and pressing of the second end causes performance of a second function;
   a sliding member comprising a base portion configured to be coupled to the side key, and a latch portion, wherein the latch portion is configured to engage a back cover of the mobile device; and
   a spring member configured to be provided with a preload so as to hold the sliding member against the side key,
   wherein the back cover releasing mechanism comprises at least one of the following configurations:
      (a) the spring member is configured to be positioned at an opposite side of the latch portion from the side key;
      (b) the spring member is configured to be positioned at an opposite end of the base portion from the side key; or
      (c) the side key is configured with a dent at its central area, wherein the dent in the central area is stiffer than the first and second ends of the side key;
   and
   wherein the latch portion is also configured to be disengaged from the back cover of the mobile device if the first end and the second end of the side key are both pressed toward interior of the mobile device and the base portion of the sliding member is forced to move toward the interior of the mobile device and wherein when only one of the first end and the second end of the side key is pressed toward the interior of the mobile device, the latch portion is not disengaged from the back cover.

2. The back cover releasing mechanism according to claim 1, further comprising one or more elastic members between the back cover and a main body of the mobile device, configured to be positioned close to the sliding member, wherein in response to the latch portion of the sliding member being disengaged from the back cover, at least a part of the back cover springs away from the main body by force from the one or more elastic members.

3. The back cover releasing mechanism according to claim 1, wherein the side key is configured to be flexible-connected with the back cover.

4. The back cover releasing mechanism according to claim 1, wherein the side key is a volume key of the mobile device.

5. The back cover releasing mechanism according to claim 1, wherein an end of the latch portion extends toward the side key.

6. The back cover releasing mechanism according to claim 1, wherein an end of the latch portion extends parallel to the longitude direction of the side key.

7. The back cover releasing mechanism according to claim 1, wherein a force for pressing the first end and the second end of the side key together ranges from 10 newton to 20 newton, and a distance that the side key moves due to the press ranges from 0.3 mm to 1 cm.

8. The back cover releasing mechanism according to claim 1, wherein a force for pressing either of the first end and the second end of the side key is less than 10 newton, and a distance that the pressed end of the side key moves due to the press ranges from 0.1 mm to 0.5 mm.

9. The back cover releasing mechanism according to claim 1, wherein the latch portion is a hook.

10. The back cover according to claim 9, wherein the profile portion is configured to be in proximity to the latch portion and extends opposite to the extending direction of the latch portion.

11. A back cover of a mobile device, comprising a profile portion forming on its inner side, configured to detachably engage the latch portion of the sliding member of the back cover releasing mechanism according to claim 1.

12. A mobile device, comprising a back cover releasing mechanism according to claim 1, a back cover comprising a profile portion forming on its inner side, configured to detachably engage the latch portion of the sliding member of the back cover releasing mechanism, a flexible printed wiring circuit board for generating electronic signals.

13. The back cover releasing mechanism according to claim 1, wherein in an instance one of the first end or second end of the side key is pressed, the sliding member functions as a pivot for the side key.

14. The back cover releasing mechanism according to claim 1, wherein in an instance one of the first end or second end of the side key is pressed, a flexible connection associated with the pressed first end or second end is distorted and a flexible connection associated with the other of the first end or second end is undistorted.

15. The back cover releasing mechanism according to claim 1, wherein the side key is configured such that pressing of the first end causes an increase in volume and pressing of the second end causes a decrease in the volume.

16. The back cover releasing mechanism according to claim 1, wherein in an instance one of the first end or second end of the side key is pressed, a plunger associated with the pressed first end or second end is compressed so as to trigger related circuits.

17. An apparatus comprising a back cover releasing mechanism, wherein the back cover releasing mechanism comprises:

an elongated side key comprising a first end and a second end, where the elongated side key is configured to be mounted on a side of a mobile device such that a longitude direction of the side key is parallel with the a side of the mobile device, wherein the side key is a multifunction key configured such that pressing of the first end causes performance of a first function and pressing of the second end causes performance of a second function;

a sliding member comprising a base portion coupled to the side key, and a latch portion, wherein the latch portion is configured to engage a back cover of the mobile device, and a spring member configured to be provided with a pre-load so as to hold the sliding member against the side key, wherein the back cover releasing mechanism comprises at least one of the following configurations:

(a) the spring member is configured to be positioned at an opposite side of the latch portion from the side key;

(b) the spring member is configured to be positioned at an opposite end of the base portion from the side key; or (c) the side key is configured with a dent at its central area, wherein the dent in the central area is stiffer than the first and second ends of the side key;

and where the latch portion is configured to disengage from the back cover of the mobile device when the first end and the second end of the side key are both pressed toward an interior of the mobile device and when the base portion of the sliding member is forced to move toward the interior of the mobile device and wherein when only one of the first end and the second end of the side key is reused toward the interior of the mobile device, the latch portion is not disengaged from the hack cover.

18. The apparatus according to claim 17, wherein the back cover releasing mechanism further comprises one or more elastic members between the back cover and a main body of the mobile device, configured to be positioned close to the sliding member, wherein in response to the latch portion of the sliding member being disengaged from the back cover, at least a part of the back cover springs away from the main body by force from the one or more elastic members.

19. The apparatus according to claim 17, wherein the side key is a volume key of the mobile device.

20. The apparatus according to claim 17, wherein an end of the latch portion extends toward the side key.

* * * * *

UNITED STATES PATENT AND TRADEMARK OFFICE
CERTIFICATE OF CORRECTION

PATENT NO. : 9,699,280 B2
APPLICATION NO. : 14/529411
DATED : July 4, 2017
INVENTOR(S) : Huang et al.

Page 1 of 1

It is certified that error appears in the above-identified patent and that said Letters Patent is hereby corrected as shown below:

In the Claims

Column 7,
Line 31, Claim 12 "mechanism," should read --mechanism, and--.

Column 8,
Line 5, Claim 17 "a side" should read --side--.
Line 38, Claim 17 "reused" should read --pressed--.
Line 40, Claim 17 "hack" should read --back--.

Signed and Sealed this
Twenty-seventh Day of March, 2018

Andrei Iancu
*Director of the United States Patent and Trademark Office*